June 15, 1937.　　　R. R. DUPLER　　　2,083,988
GLOBE
Filed Aug. 5, 1936
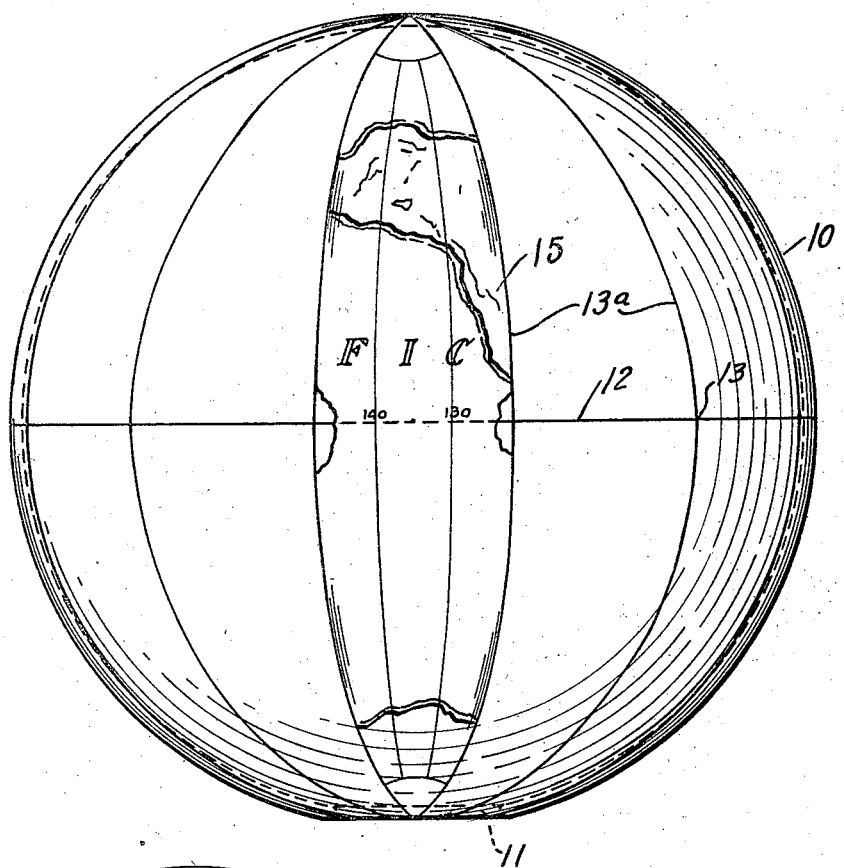
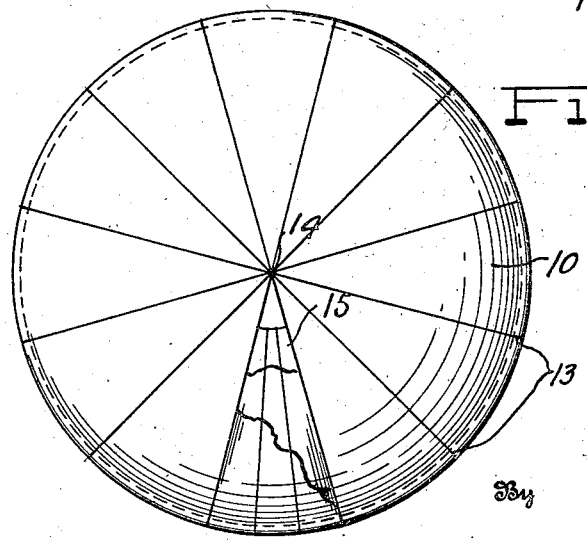
Inventor
Raymond R. Dupler Patented June 15, 1937

2,083,988

UNITED STATES PATENT OFFICE 2,083,988

GLOBE

Raymond R. Dupler, Toledo, Ohio

Application August 5, 1936, Serial No. 94,314

3 Claims. (Cl. 35—46)

This invention relates to the manufacture of globes of glass or other molded materials, which are covered with flexible sheet material, such as paper on which is depicted the map of the world.

Heretofore, in applying maps to globes of the molded materials it has been a difficult problem to properly arrange the sections of the map in order to have the finished map accurately positioned with respect to the contour of the globe. It has not only been a slow and tedious task but even with the exercise of great care, it has not always been possible to attain accuracy because the paper at times must be stretched in order to make the sections of the completed map cover the entire surface of the globe.

In accordance with this invention the above difficulties are overcome and a map or the like can be applied to a globe of glass or some similar material conveniently and accurately, thereby facilitating production and insuring proper arrangement of the several parts in an efficient and economical manner.

An embodiment of the invention is shown on the accompanying drawing in which:

Figure 1 is a side elevation of a glass globe showing one segment or gore of a map applied thereto; and Figure 2 is a top plan view of the structure shown in Figure 1.

The illustrated embodiment of the invention comprises a molded glass ball or globe 10, the lower end of which is formed with an opening 11 to receive a lamp bracket or mounting in order that the globe may be illuminated by a source of light on the inside thereof. The globe is formed by molding as for example in a steel mold which is so constructed and arranged that a line 12, along which the mold parts separate from each other, is formed dividing the globe into two equal parts and disposed in the region of the equator, considering the globe to represent a terrestrial globe. The line 12 is formed in any suitable manner from the contour or construction of the mold and although it is readily visible it preferably does not extend to any material degree beyond the peripheral surface of the globe. The line 12 is divided into a number of equal sections by relatively small indicator marks 13 which are formed during molding such as by scratching the mold at the points desired. The number of indicator marks may be varied as desired but in practice it is found that for the average size globe, they should not be less than four although as many as twelve have proved desirable particularly for larger globes. Lines 13ª intersect the marks 13 and extend circumferentially of the globe and are also produced by marking or scratching the mold as above described. Where the lines 13ª intersect each other, the point 14, the North Pole, for example is accurately located. In practice, it is found that the lines 12 and 13ª are of slightly different surface elevation than the adjacent portions of the globe body.

If the globe is to be covered by a map of the world, it is desirable that the map be made up of a plurality of adhesively attached segments or gores 15, the aggregate of all the gores completely covering the globe 10. To facilitate applying and accurate positioning, one end of each gore must be applied adjacent the mark 14 and the intermediate portion reach between a pair of lines 13ª on the line 12. Sometimes it is necessary to stretch the sheet so as to cover completely the area but when applied in this manner, it is possible to be certain that in the end the entire surface will be covered. If less number of indicator marks 13 and lines 13ª are employed, two or more gores may be required to cover the area between a pair of lines.

It will be apparent that by this simple and inexpensive procedure a globe can be efficiently and satisfactorily covered by an unskilled person and each globe will be covered uniformly.

Changes in details of arrangement and operation may be effected without departing from the spirit of the invention, as defined by the claims.

What I claim as new and desire to secure by Letters Patent is:

1. A globe of glass or similar material having an equatorial center line, a plurality of equally spaced circumferential lines dividing the equatorial line into equal sections intersecting each other in the center of one end of the globe, said lines being formed as ridges on the body and of the material of the body.

2. A globe of glass or similar material having an equatorial center line, a meridian line dividing the equatorial line into equal sections, and a mark on said meridian line midway between the intersections of the meridian line and the equatorial line, said lines and mark being of the material of the body and being of different surface elevation than adjacent portions of the globe body.

3. A globe of glass or similar material having an equatorial center line, and a mark on said globe indicating one of the poles, said line and mark being of the material of the body and being of different surface elevation than adjacent portions of the globe body.

RAYMOND R. DUPLER.